(12) United States Patent
Tachikawa

(10) Patent No.: US 12,594,876 B2
(45) Date of Patent: Apr. 7, 2026

(54) HEADLAMP CONTROL DEVICE, HEADLAMP CONTROL METHOD, AND STORAGE MEDIUM

(71) Applicant: TOYOTA JIDOSHA KABUSHIKI KAISHA, Toyota (JP)

(72) Inventor: Hisayoshi Tachikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 112 days.

(21) Appl. No.: 18/804,200

(22) Filed: Aug. 14, 2024

(65) Prior Publication Data

US 2025/0178520 A1 Jun. 5, 2025

(30) Foreign Application Priority Data

Dec. 5, 2023 (JP) ................................. 2023-205181

(51) Int. Cl.
| | |
|---|---|
| *B60Q 1/14* | (2006.01) |
| *B60Q 1/00* | (2006.01) |
| *H05B 47/125* | (2020.01) |

(52) U.S. Cl.
CPC .......... *B60Q 1/143* (2013.01); *B60Q 1/0023* (2013.01); *H05B 47/125* (2020.01); *B60Q 2300/112* (2013.01); *B60Q 2300/12* (2013.01); *B60Q 2300/41* (2013.01); *B60Q 2300/42* (2013.01)

(58) Field of Classification Search
None
See application file for complete search history.

(56) References Cited

U.S. PATENT DOCUMENTS

| | | | | |
|---|---|---|---|---|
| 5,796,094 A * | 8/1998 | Schofield | .............. | B60S 1/0885 |
| | | | | 348/E7.086 |
| 7,004,606 B2 * | 2/2006 | Schofield | ............. | B60Q 1/1423 |
| | | | | 362/465 |
| 7,359,782 B2 * | 4/2008 | Breed | ..................... | G01S 7/023 |
| | | | | 710/48 |
| 8,983,771 B2 * | 3/2015 | Breed | ................... | G08G 1/166 |
| | | | | 701/423 |
| 10,757,485 B2 * | 8/2020 | Al-Stouhi | .............. | G07C 5/008 |
| 10,759,329 B2 | 9/2020 | Morimura et al. | | |
| 10,946,791 B2 | 3/2021 | Morimura et al. | | |
| 11,260,789 B2 | 3/2022 | Morimura et al. | | |
| 2020/0150702 A1 | 5/2020 | Ueda | | |

FOREIGN PATENT DOCUMENTS

JP 2020-181310 A 11/2020

* cited by examiner

*Primary Examiner* — Kenneth B Wells
(74) *Attorney, Agent, or Firm* — SoraIP, Inc.

(57) ABSTRACT

The headlamp control device acquires a result of learning of the recognition sensitivity of the forward vehicle during lighting of the lamp included in the forward camera image of the probe vehicle suitable for each traveling position of the probe vehicle performed using the traveling position of the probe vehicle and the forward camera image of the probe vehicle when the driver of the probe vehicle performs an operation to turn OFF the function of switching the light distribution of the headlamp of the probe vehicle from the lighting state of the high beam to the lighting state of the light shielding high beam, and adjusts the recognition sensitivity of the forward vehicle during lighting of the lamp included in the forward camera image of the own vehicle at each traveling position of the own vehicle based on the obtained result of the learning.

5 Claims, 3 Drawing Sheets

HEADLAMP CONTROL DEVICE, HEADLAMP CONTROL METHOD, AND STORAGE MEDIUM

CROSS-REFERENCE TO RELATED APPLICATION

This application claims priority to Japanese Patent Application No. 2023-205181 filed on Dec. 5, 2023, incorporated herein by reference in its entirety.

BACKGROUND

1. Technical Field

The present disclosure relates to a headlamp control device, a headlamp control method, and a storage medium.

2. Description of Related Art

Japanese Unexamined Patent Application Publication No. 2020-181310 (JP 2020-181310 A) describes that when a driver is overwhelmed by automatic lighting control performed during automatic lighting control in auto mode and sets lighting to a lit/unlit state in manual mode, a camera image at the time of the setting and the lit/unlit state of the lighting at that time are used as training data. Also, JP 2020-181310 A describes that learning processing of a discriminator using the training data is performed at a server. Further, JP 2020-181310 describes that the discriminator for determining the lit/unlit state of the lighting is updated by performing learning with respect to images obtained during driving of a vehicle. There is known a system (AHS (adaptive high beam system)) in which light distribution switching control of a headlamp of a own vehicle from a high-beam lit state to a shielded high-beam lit state is automatically performed, when a forward vehicle with a lamp lit included in a forward camera image of the own vehicle is recognized. Also, there is known a system (AHB (automatic high beam)) in which light distribution switching control of a headlamp of the own vehicle from a high-beam lit state to a low-beam lit state is automatically performed when a forward vehicle with a lamp lit included in a forward camera image of the own vehicle is recognized.

SUMMARY

There is a phenomenon in which the driver of the own vehicle dislikes the AHS/AHB not operating or malfunctioning, and manually turns off functions of the AHS/AHB. When the forward vehicle is not recognized even though the forward vehicle with a lamp lit, included in forward camera images of the own vehicle, is present, the AHS/AHB does not operate. When a forward vehicle that with a lamp lit included in a forward camera image of the own vehicle is misidentified as being present, even though no such forward vehicle is present, the AHS/AHB malfunctions. Simply applying the learning described in JP 2020-181310 A, for example, with respect to such a phenomenon, may cause the system to turn off the functions of the AHS/AHB under its own judgement, even though the driver wants to keep the functions of the AHS/AHB turned on. There are also cases in which inappropriate learning may be performed, based on an operation of the driver to continue a high-beam lit state, even though a forward vehicle with a lamp lit included in a forward camera image of the own vehicle is present. In this case, there is a concern that the system will perform control of turning on the headlamp of the own vehicle in the high-beam lit state regardless of the presence of the forward vehicle with the lamp lit included in the forward camera image of the own vehicle, based on results of such learning. That is to say, when the learning results are used to directly control whether the headlamp of the own vehicle is in the high-beam lit state, the shielded high-beam lit state, or the low-beam lit state, there is a concern that inappropriate control will be performed.

In view of the above-described points, an object of the present disclosure is to provide a headlamp control device, a headlamp control method, and a program capable of controlling whether a headlamp of an own vehicle is set to a high-beam lit state, a shielded high-beam lit state, or a low-beam lit state, as appropriate, by using learning results.

(1) One aspect of the present disclosure is a headlamp control device including a vehicle recognition unit that recognizes a forward vehicle with a lamp lit included in a forward camera image of an own vehicle, a control unit for, when the forward vehicle with the lamp lit that is included in the forward camera image of the own vehicle is recognized by the vehicle recognition unit, executing light distribution switching control of a headlamp of the own vehicle from a high-beam lit state to a shielded high-beam lit state that is a high-beam lit state in which the forward vehicle with the lamp lit that is included in the forward camera image of the own vehicle, and surroundings of the forward vehicle, are shielded from light, or light distribution switching control of the headlamp of the own vehicle from the high-beam lit state to a low-beam lit state, an acquisition unit for acquiring a result of learning of recognition sensitivity of the forward vehicle with the lamp lit that is included in a forward camera image of a probe vehicle that is suitable for each traveling position of the probe vehicle, performed using a traveling position of the probe vehicle and a forward camera image of the probe vehicle, when a driver of the probe vehicle performs an operation of turning off a function of light distribution switching control of a headlamp of the probe vehicle from a high-beam lit state to a shielded high-beam lit state, or an operation of turning off a function of light distribution switching control of the headlamp of the probe vehicle from the high-beam lit state to a low-beam lit state, and a vehicle recognition sensitivity adjustment unit that executes adjustment of recognition sensitivity of the forward vehicle with a lamp lit that is included in a forward camera image of the own vehicle at each traveling position of the own vehicle, based on the result of the learning acquired by the acquisition unit.

(2) In the headlamp control device according to (1), the acquisition unit may acquire a detection result of a steering angle sensor of the own vehicle, and when a steering angle detected by the steering angle sensor is equal to or greater than a steering angle threshold value, the vehicle recognition sensitivity adjustment unit may set the recognition sensitivity of the forward vehicle with a lamp lit included in the forward camera image of the own vehicle to a default value.

(3) In the headlamp control device according to (1), the acquisition unit may acquire a detection result of a vehicle speed sensor of the own vehicle, and when vehicle speed detected by the vehicle speed sensor is equal to or higher than a vehicle speed threshold value, the vehicle recognition sensitivity adjustment unit may set the recognition sensitivity of the forward vehicle with a lamp lit included in the forward camera image of the own vehicle to a default value.

(4) One aspect of the present disclosure is a headlamp control method including recognizing, by a headlamp control device, a forward vehicle with a lamp lit included in a forward camera image of an own vehicle, executing, by the headlamp control device, when the forward vehicle with the lamp lit that is included in the forward camera image of the own vehicle is recognized in the recognizing, light distribution switching control of a headlamp of the own vehicle from a high-beam lit state to a shielded high-beam lit state that is a high-beam lit state in which the forward vehicle with the lamp lit that is included in the forward camera image of the own vehicle, and surroundings of the forward vehicle, are shielded from light, or light distribution switching control of the headlamp of the own vehicle from the high-beam lit state to a low-beam lit state, acquiring, by the headlamp control device, a result of learning of recognition sensitivity of the forward vehicle with the lamp lit that is included in a forward camera image of a probe vehicle that is suitable for each traveling position of the probe vehicle, performed using a traveling position of the probe vehicle and a forward camera image of the probe vehicle, when a driver of the probe vehicle performs an operation of turning off a function of light distribution switching control of a headlamp of the probe vehicle from a high-beam lit state to a shielded high-beam lit state, or an operation of turning off a function of light distribution switching control of the headlamp of the probe vehicle from the high-beam lit state to a low-beam lit state, and executing, by the headlamp control device, adjustment of recognition sensitivity of the forward vehicle with a lamp lit that is included in a forward camera image of the own vehicle at each traveling position of the own vehicle, based on the result of the learning acquired in the acquiring.

(5) One aspect of the present disclosure is a storage medium storing a program causing a processor to execute recognizing a forward vehicle with a lamp lit included in a forward camera image of an own vehicle, executing, when the forward vehicle with the lamp lit that is included in the forward camera image of the own vehicle is recognized in the recognizing, light distribution switching control of a headlamp of the own vehicle from a high-beam lit state to a shielded high-beam lit state that is a high-beam lit state in which the forward vehicle with the lamp lit that is included in the forward camera image of the own vehicle, and surroundings of the forward vehicle, are shielded from light, or light distribution switching control of the headlamp of the own vehicle from the high-beam lit state to a low-beam lit state, acquiring a result of learning of recognition sensitivity of the forward vehicle with the lamp lit that is included in a forward camera image of a probe vehicle that is suitable for each traveling position of the probe vehicle, performed using a traveling position of the probe vehicle and a forward camera image of the probe vehicle, when a driver of the probe vehicle performs an operation of turning off a function of light distribution switching control of a headlamp of the probe vehicle from a high-beam lit state to a shielded high-beam lit state, or an operation of turning off a function of light distribution switching control of the headlamp of the probe vehicle from the high-beam lit state to a low-beam lit state, and executing adjustment of recognition sensitivity of the forward vehicle with a lamp lit that is included in a forward camera image of the own vehicle at each traveling position of the own vehicle, based on the result of the learning acquired in the acquiring.

According to the present disclosure, whether to set the headlamp of the own vehicle to the high-beam lit state, the shielded high-beam lit state, or the low-beam lit state, can be controlled as appropriate, using the learning results.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of a headlamp control device, a headlamp control method, and a program according to the present disclosure will be described below with reference to the drawings.

First Embodiment

Figure 1:
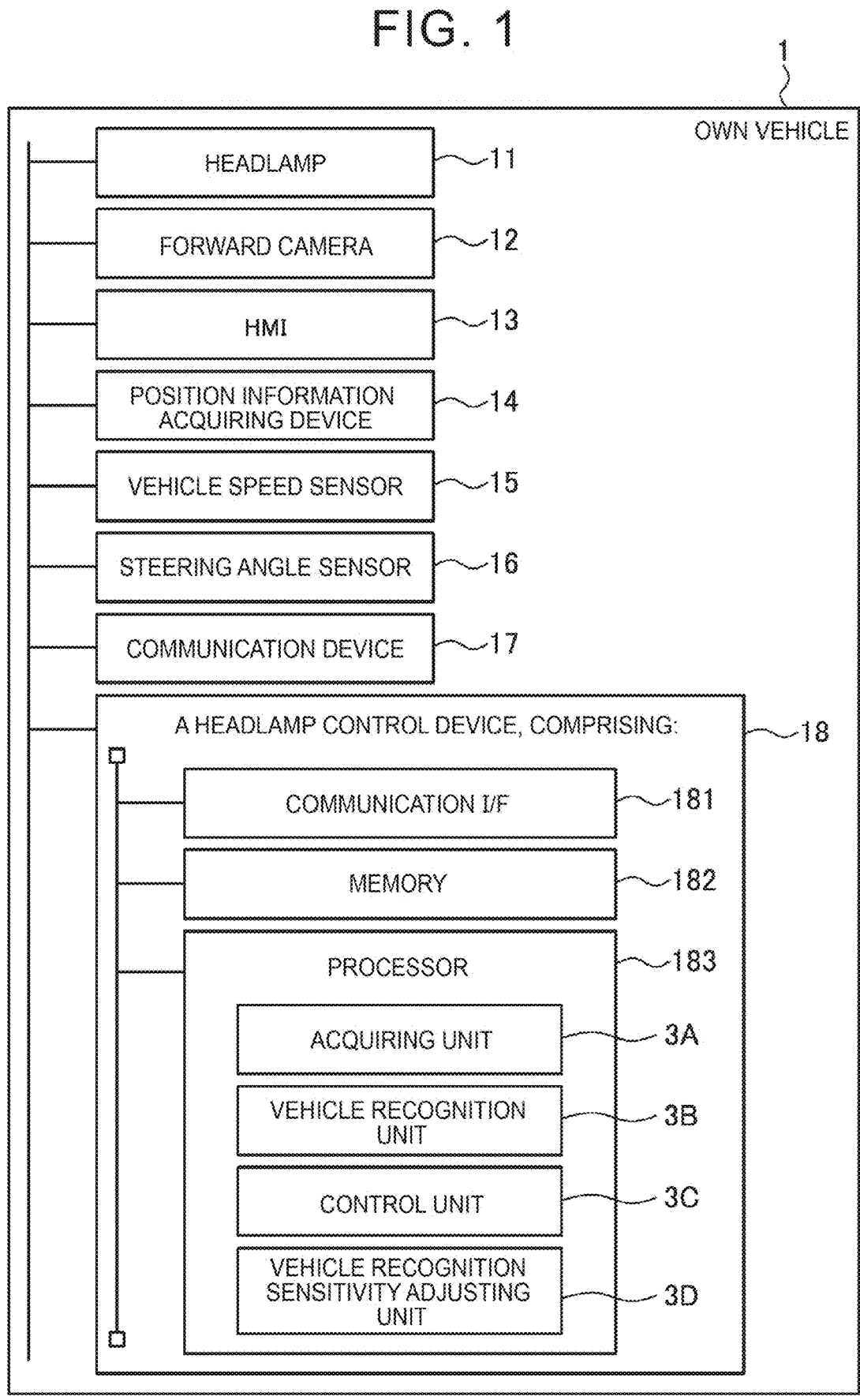
FIG. 1 is a diagram illustrating an example of an own vehicle 1 to which a headlamp control device 18 according to a first embodiment is applied.
Figure 2:
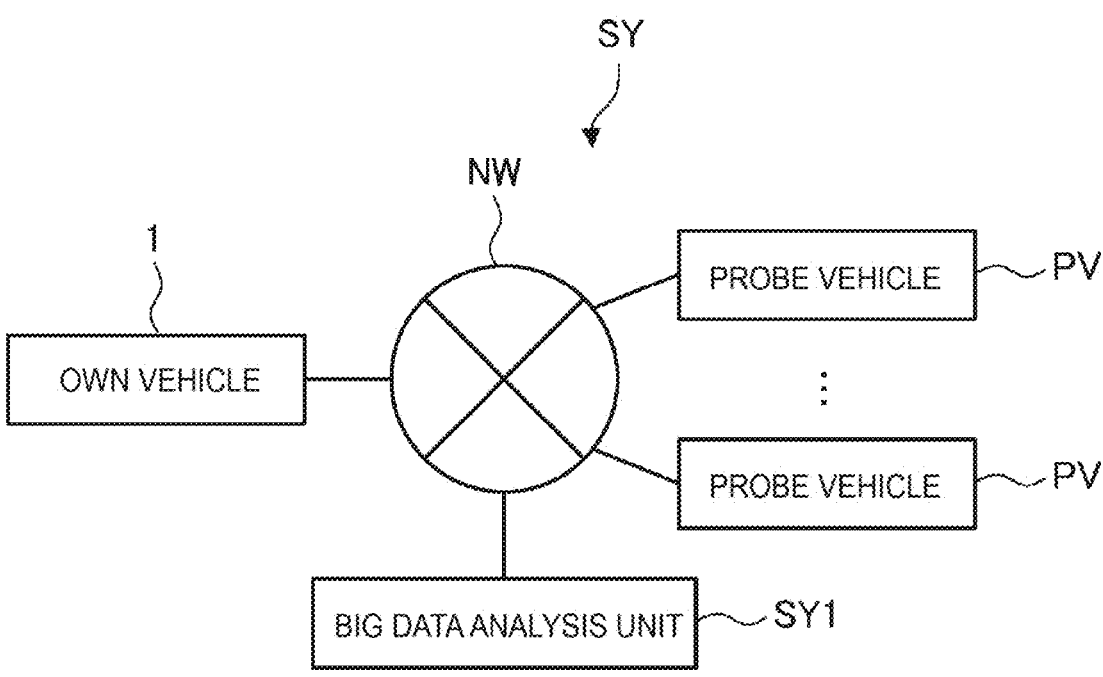
FIG. 2 is a diagram illustrating an exemplary vehicle recognition sensitivity adjustment system SY including the own vehicle 1 illustrated in FIGS. 1.

FIG. 1 is a diagram illustrating an example of the own vehicle 1 to which the headlamp control device 18 according to the first embodiment is applied. FIG. 2 is a diagram illustrating an exemplary vehicle recognition sensitivity adjustment system SY including the own vehicle 1 illustrated in FIG. 1.

In the embodiments illustrated in FIGS. 1 and 2, the own vehicle 1 includes a headlamp 11, a forward camera 12, an HMI (Human Machine Interface) 13, a position information acquiring device 14, a vehicle speed sensor 15, a steering angle sensor 16, a communication device 17, and a headlamp control device 18.

The headlamp 11 has a function of turning on a high beam, a function of turning on a light-shielding high beam that is a high beam that blocks light from a forward vehicle and its surroundings while lighting a lamp included in a forward camera image to be described later, and a function of turning on a low beam. The forward camera 12 captures an image of the front of the own vehicle 1 and transmits the forward camera image to the headlamp control device 18. HMI13 has a function of accepting various operations of the driver of the own vehicle 1, and transmits a signal indicating the operation of the driver of the own vehicle 1 to the headlamp control device 18. The operation of the driver of the own vehicle 1 includes, for example, an operation of turning OFF the function of the light distribution switching control of the headlamp 11 from the lighting state of the high beam to the lighting state of the light-shielded high beam.

The position information acquiring device 14 acquires information indicating a traveling position (for example, latitude, longitude, azimuth (i.e., direction of the own vehicle 1)) of the own vehicle 1. The positional information acquiring device 14 includes, for example, a GPS (Global Positioning System) device that measures latitude, longitude, and azimuth of the own vehicle 1. The position information acquiring device 14 may perform a well-known self-position estimation process (localization) to increase the accuracy of information indicating the latitude, longitude, and azimuth of the own vehicle 1.

The position information acquiring device 14 transmits information indicating the traveling position (for example, latitude, longitude, azimuth, and the like) of the own vehicle 1 to the headlamp control device 18.

The vehicle speed sensor 15 detects the vehicle speed of the own vehicle 1 and transmits the detection result to the headlamp control device 18. The steering angle sensor 16 detects a steering angle (an angle of a steering wheel (not shown) of the own vehicle 1) and transmits a detection result to the headlamp control device 18. The communication device 17 communicates with the big data analysis unit SY1 and the like included in the vehicle recognition sensitivity adjustment system SY.

When HMI13 receives, from the driver of the own vehicle 1, an operation of turning OFF the light distribution switching control function of the headlamp 11 from the lighting state of the high beam to the lighting state of the light shielding high beam, the communication device 17 transmits information indicating the operation to the big data analysis unit SY1. In addition, the communication device 17 transmits, to the big data analysis unit SY1, information indicating the traveling position of the own vehicle 1 and forward camera images when HMI13 accepts the manipulation. Further, the communication device 17 receives a result of learning, which will be described later, performed by the big data analysis unit SY1, and transmits the result of the learning to the headlamp control device 18.

The headlamp control device 18 is constituted by a microcomputer including a communication interface (I/F) 181, a memory 182, and a processor 183. The communication interface 181 has interface circuitry for connecting the headlamp control device 18 to the headlamp 11, the forward camera 12, HMI13, the position information acquiring device 14, the vehicle speed sensor 15, the steering angle sensor 16, the communication device 17, and the like. The memory 182 stores programs and various types of data used in processing executed by the processor 183. Further, the memory 182 stores a default value of vehicle recognition sensitivity, a vehicle speed threshold, a steering angle threshold, and the like, which will be described later. The processor 183 has a function as an acquiring unit 3A, a function as a vehicle recognition unit 3B, a function as a control unit 3C, and a function as a vehicle recognition sensitivity adjusting unit 3D.

The acquiring unit 3A acquires forward camera images transmitted from the forward camera 12. Further, the acquiring unit 3A acquires information indicating the traveling position (for example, latitude, longitude, azimuth, and the like) of the own vehicle 1 transmitted from the position information acquiring device 14. Further, the acquiring unit 3A acquires information (the detection result of the vehicle speed sensor 15) indicating the vehicle speed of the own vehicle 1 transmitted from the vehicle speed sensor 15. Further, the acquiring unit 3A acquires information indicating the steering angle of the own vehicle 1 (the detection result of the steering angle sensor 16) transmitted from the steering angle sensor 16. Further, the acquiring unit 3A obtains the result of the learning transmitted from the communication device 17.

In the exemplary embodiments illustrated in FIGS. 1 and 2, the vehicle recognition sensitivity adjustment system SY includes a big data analysis unit SY1, a own vehicle 1, and a plurality of probe vehicle PV.

When the driver of the probe vehicle PV performs an operation of turning OFF the function of the light distribution switching control of the headlamp of the probe vehicle PV from the lighting state of the high beam to the lighting state of the shielded high beam, each of the plurality of probe vehicle PV transmits information indicating the operation to the big data analysis unit SY1. Further, each of the plurality of probe vehicle PV transmits, to the big data analysis unit SY1, information indicating the traveling position of the probe vehicle PV and forward camera images of the probe vehicle PV when the driver of the probe vehicle PV performs the manipulation.

Further, when the driver of the probe vehicle PV performs an operation of turning OFF the function of the light distribution switching control of the headlamp of the probe vehicle PV from the lighting state of the high beam to the lighting state of the low beam, each of the plurality of probe vehicle PV transmits the information indicating the operation to the big data analysis unit SY1. Further, each of the plurality of probe vehicle PV transmits, to the big data analysis unit SY1, information indicating the traveling position of the probe vehicle PV and forward camera images of the probe vehicle PV when the driver of the probe vehicle PV performs the manipulation.

The big data analysis unit SY1 learns the recognition-sensitivity of the forward vehicle while lighting the lamps included in the forward camera images of the probe vehicle PV suitable for the respective traveling positions of the probe vehicle PV, using the traveling position of the probe vehicle PV and the forward camera images of the probe vehicle PV. The traveling position of the probe vehicle PV and the forward camera image of the probe vehicle PV are the traveling position of the probe vehicle PV and the forward camera image of the probe vehicle PV when the driver of the probe vehicle PV performs an operation of turning OFF the light distribution switching control function of the headlamp of the probe vehicle PV from the lighting state of the high beam to the lighting state of the light-shielded high beam. Further, the traveling position of the probe vehicle PV and the forward camera image of the probe vehicle PV are the traveling position of the probe vehicle PV and the forward camera image of the probe vehicle PV when the driver of the probe vehicle PV performs an operation of turning OFF the light distribution switching control function of the headlamp of the probe vehicle PV from the lighting state of the high beam to the lighting state of the low beam.

Specifically, for example, the big data analysis unit SY1 performs training using teacher data that is a data set with a data set indicating whether a forward camera image of each traveling position of the probe vehicle PV and a forward camera image of each traveling position of the probe vehicle PV need to increase the recognition sensitivity of the forward vehicle during lighting of the lamp included in each traveling position of the probe vehicle PV from a default value (that is, the lamp included in the forward camera image is likely to be recognized) or lower than a default value (that is, the lamp included in the forward camera image is difficult to be recognized) or a label indicating whether the lamp needs to be set to a default value.

Further, by using the model obtained by performing the learning, the big data analysis unit SY1 generates, as a result of the learning (recommended vehicle recognition sensitivity), information indicating whether it is necessary to increase the recognition sensitivity of the forward vehicle during lighting of the lamp included in the forward camera image from the default value, to lower than the default value, or to set to the default value, based on the forward camera image at each of the traveling positions of the own vehicle 1 and the plurality of probe vehicle PV, and transmits the result of the learning to the own vehicle 1 or the like.

In the exemplary embodiments illustrated in FIGS. 1 and 2, as described above, the big data analysis unit SY1 learns the recognition-sensitivity of the forward vehicle while lighting the lamps included in the forward camera images of the probe vehicle PV suitable for the respective traveling positions of the probe vehicle PV, using the traveling position of probe vehicle PV and the forward camera image of the probe vehicle PV. The travel position of the probe vehicle PV and the forward camera image of the probe vehicle PV are the travel position of the probe vehicle PV and the forward camera image of the probe vehicle PV when the driver of the probe vehicle PV performs an operation of turning OFF the function of the light distribution switching control of the headlamp of the probe vehicle PV from the lighting state of the high beam to the lighting state of the light-shielded high beam. Further, the travel position of the probe vehicle PV and the forward camera image of the probe vehicle PV are the travel position of the probe vehicle PV and the forward camera image of the probe vehicle PV when the driver of the probe vehicle PV performs an operation of turning OFF the function of the light distribution switching control of the headlamp of the probe vehicle PV from the lighting state of the high beam to the lighting state of the low beam.

In another example, the big data analysis unit SY1 may learn the recognition sensitivity of the forward vehicle during lighting of the headlamp included in the forward camera image of the probe vehicle PV suitable for the respective traveling positions of the probe vehicle PV using the traveling position of the probe vehicle PV and the forward camera image of the probe vehicle PV when the driver of the probe vehicle PV performs an operation to turn OFF the function of switching the light distribution of the headlamp of the probe vehicle PV from the lighting state of the high beam to the lighting state of the low beam, and without using the traveling position of the probe vehicle PV and the forward camera image of the probe vehicle PV when the driver of the probe vehicle PV performs an operation to turn OFF the function of switching the light distribution of the probe vehicle PV from the lighting state of the high beam to the lighting state of the light shielding high beam.

In the examples illustrated in FIGS. 1 and 2, the vehicle recognition sensitivity adjusting unit 3D performs adjustment of the recognition sensitivity of the forward vehicle during lighting of the lamps included in the forward camera images of the own vehicle 1 at the respective traveling positions of the own vehicle 1 based on the result of the learning acquired by the acquiring unit 3A (recommended vehicle recognition sensitivity) (that is, the recognition sensitivity is increased from the default value so that the forward vehicle is easily recognized, the recognition sensitivity is decreased from the default value so that the forward vehicle is hardly recognized, or the recognition sensitivity is set to the default value).

The vehicle recognition unit 3B recognizes the forward vehicle on which the lamps included in the forward camera images of the own vehicle 1 are lit, with the recognition sensitivity adjusted by the vehicle recognition sensitivity adjusting unit 3D.

The control unit 3C executes the light distribution switching control of the headlamp 11 of the own vehicle 1 from the lighting state of the high beam to the lighting state of the light shielding high beam when the forward vehicle that is lighting the lamp included in the forward camera image of the own vehicle 1 is recognized by the vehicle recognition unit 3B.

More specifically, in the example shown in FIGS. 1 and 2, when the vehicle speed detected by the vehicle speed sensor 15 is greater than the vehicle speed threshold, the vehicle recognition sensitivity adjusting unit 3D sets the recognition sensitivity of the forward vehicle during the lighting on the own vehicle 1 to the default value without increasing the recognition sensitivity of the vehicle during the lighting on the vehicle, even if the results of the learning obtained by the acquiring unit 3A (recommended vehicle recognition sensitivity) indicate that the recognition sensitivity of the forward vehicle during the lighting on the ramp contained in the forward camera image of the own vehicle 1 needs to be increased from the default value. Therefore, with the light distribution switching control of the headlamp of the own vehicle 1 to the lighting state of the shaded high beam from the lighting state of the high beam at the time of high-speed running of the own vehicle 1 that needs to maintain the lighting state of the high beam is executed, it is possible to suppress the possibility that the view of the driver of the own vehicle 1 will be deprived. In addition, when the vehicle speed detected by the vehicle speed sensor 15 is equal to or more than the vehicle speed threshold value, the vehicle recognition sensitivity adjusting unit 3D sets the recognition sensitivity of the forward vehicle in lighting the lamp included in the forward camera image of the own vehicle 1 to the default value without decreasing the recognition sensitivity of the forward vehicle in lighting, even if the result of the learning acquired by the acquiring unit 3A (recommended vehicle recognition sensitivity) indicates that the recognition sensitivity of the forward vehicle in lighting the lamp included in the forward camera image of the own vehicle 1 needs to be decreased from the default value. Therefore, for example, it is possible to suppress a sudden change from the lighting state of the light-shielding high beam to the lighting state of the high beam.

Further, in the examples shown in FIGS. 1 and 2, when the steering angle detected by the steering angle sensor 16 is equal to or greater than the steering angle threshold, the vehicle recognition sensitivity adjusting unit 3D sets the recognition sensitivity of the forward vehicle in which the lamp included in the forward camera image of the own vehicle 1 is turned on to the default value without increasing the recognition sensitivity of the forward vehicle in which the lamp included in the forward camera image of the own vehicle 1 is turned on to the default value, even if the result of the learning acquired by the acquiring unit 3A (recommended vehicle recognition sensitivity) indicates that the recognition sensitivity of the forward vehicle in which the lamp included in the forward camera image of the own vehicle 1 is turned on needs to be increased to the default value. Therefore, with the light distribution switching control of the headlamp of the own vehicle 1 to the lighting state of the shading high beam from the lighting state of the high beam during the steep curve running of the own vehicle 1 that needs to maintain the lighting state of the high beam is executed, the driver of the own vehicle 1 it is possible to suppress the possibility that the view will be lost.

In addition, when the steering angle detected by the steering angle sensor 16 is equal to or more than the steering angle threshold value, the vehicle recognition sensitivity adjusting unit 3D sets the recognition sensitivity of the vehicle in front of the own vehicle 1 to the default value without decreasing the recognition sensitivity of the forward vehicle in front of the vehicle in lighting the lamp included in the forward camera image of the own vehicle 1 from the default value, even if the result of the learning acquired by the acquiring unit 3A (recommended vehicle recognition sensitivity) indicates that the recognition sensitivity of the vehicle in front of the vehicle in lighting needs to be decreased from the default value. Therefore, for example, it is possible to suppress a sudden change from the lighting state of the light-shielding high beam to the lighting state of the high beam.

In the embodiments illustrated in FIGS. 1 and 2, the own vehicle 1 has a function as a probe vehicle PV. That is, similarly to the probe vehicle PV, when the driver of the own vehicle 1 performs an operation of turning OFF the light distribution switching control function of the headlamp of the own vehicle 1 from the high beam lighting state to the light shielding high beam lighting state, the own vehicle 1 transmits information indicating the operation to the big data analysis unit SY1. Further, the own vehicle 1 transmits information indicating the traveling position of the own vehicle 1 and the forward camera image of the own vehicle 1 to the big data analysis unit SY1 when the driver of the own vehicle 1 performs the operation.

Figure 3:
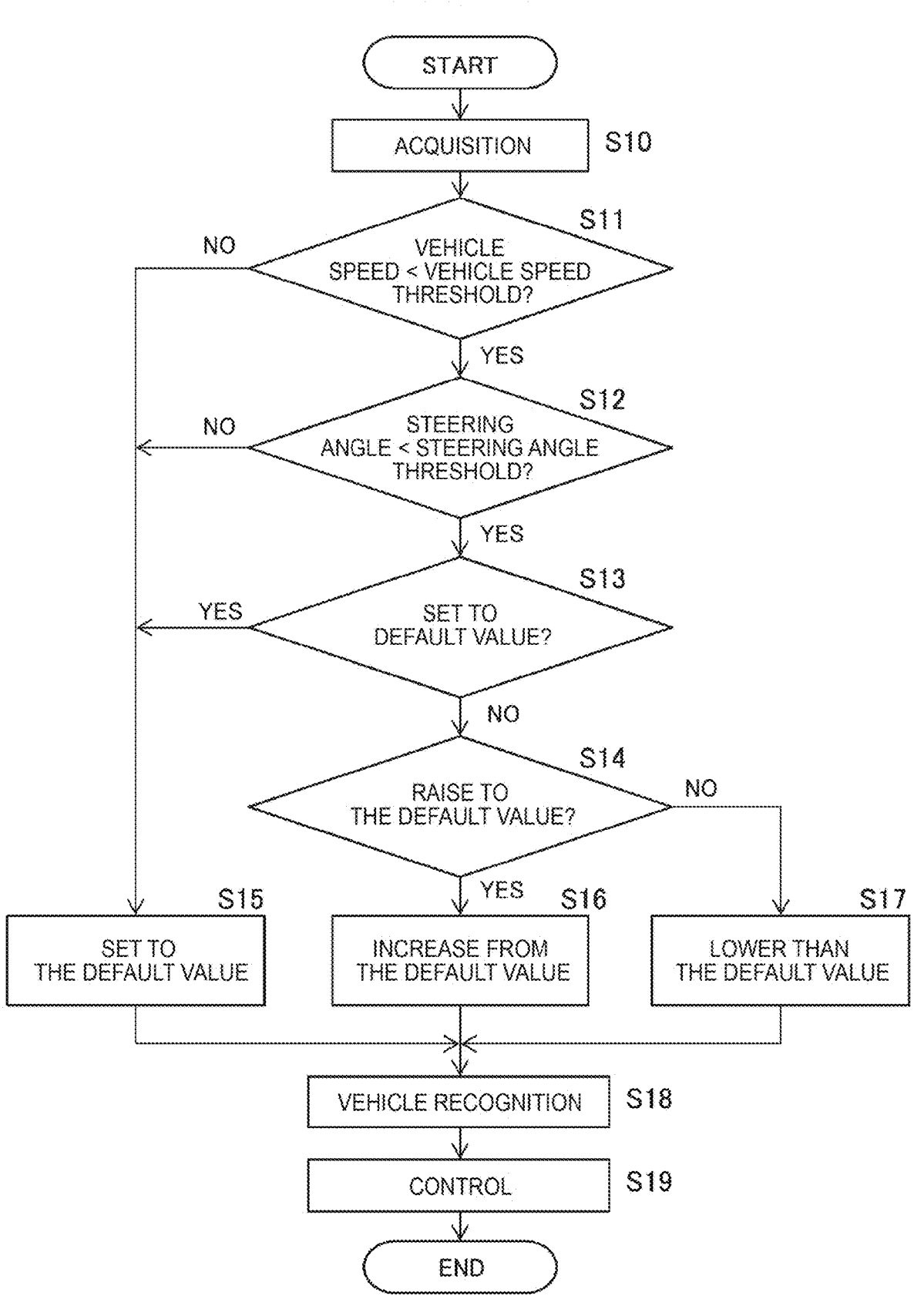
FIG. 3 is a flowchart for describing an example of a process executed by the processor 183 of the headlamp control device 18 according to the first embodiment.

FIG. 3 is a flowchart for explaining an example of a process executed by the processor 183 of the headlamp control device 18 according to the first embodiment.

In the embodiment illustrated in FIG. 3, in S10, the acquiring unit 3A acquires the forward camera image of the own vehicle 1, the information indicating the traveling position of the own vehicle 1, the information indicating the vehicle speed of the own vehicle 1, the information indicating the steering angle of the own vehicle 1, and the result of the training performed in the big data analysis unit SY1.

In S11 to S17, the vehicle recognition sensitivity adjusting unit 3D adjusts the recognition sensitivity of the forward vehicle while lighting the lamps included in the forward camera images of the own vehicle 1 at the respective traveling positions of the own vehicle 1, based on the training obtained in S10.

Specifically, in S11, the vehicle recognition-sensitivity adjusting unit 3D determines whether the vehicle speed of the own vehicle 1 acquired in S10 is lower than the vehicle speed threshold. If YES, proceed to S12; if NO, proceed to S15.

In S12, the vehicle recognition sensitivity adjusting unit 3D determines whether the steering angle of the own vehicle 1 acquired in S10 is smaller than the steering angle threshold. If YES, proceed to S13; if NO, proceed to S15.

In S13, the vehicle recognition sensitivity adjusting unit 3D determines whether or not the recognition sensitivity of the forward vehicle on which the lamp included in the forward camera image of the own vehicle 1 is turned on needs to be set to a default value, based on the forward camera image of the own vehicle 1 acquired in S10 and the result of the learning performed in the big data analysis unit SY1. If YES, proceed to S15; if NO, proceed to S14. In S14, the vehicle recognition sensitivity adjusting unit 3D determines whether or not the recognition sensitivity of the forward vehicle on which the lamp included in the forward camera image of the own vehicle 1 is turned on needs to be increased from the default value, based on the forward camera image of the own vehicle 1 acquired in S10 and the result of the training performed in the big data analysis unit SY1. If YES, proceed to S16; if NO, proceed to S17.

In S15, the vehicle recognition sensitivity adjusting unit 3D sets the recognition sensitivity of the forward vehicle while the lamp included in the forward camera image of the own vehicle 1 is lit to a default value.

In S16, the vehicle recognition sensitivity adjusting unit 3D increases the recognition sensitivity of the forward vehicle during lighting of the lamps included in the forward camera images of the own vehicle 1 from the default values.

In S17, the vehicle recognition sensitivity adjusting unit 3D reduces the recognition sensitivity of the forward vehicle below default while the light included in the forward camera image of the own vehicle 1 is turned on.

In S18, the vehicle recognition unit 3B recognizes the forward vehicle that is lighting the lamps included in the forward camera images of the own vehicle 1 with the recognition sensitivity adjusted in S11 to S17.

When S18 recognizes a forward vehicle that is lighting a lamp included in the forward camera image of the own vehicle 1, the control unit 3C executes the light distribution switching control of the headlamp 11 of the own vehicle 1 from the lighting state of the high beam to the lighting state of the light-shielding high beam in S19.

Second Embodiment

The own vehicle 1 to which the headlamp control device 18 of the second embodiment is applied is configured in the same manner as the own vehicle 1 to which the headlamp control device 18 of the first embodiment described above is applied, except for the point described later.

As described above, in the own vehicle 1 to which the headlamp control device 18 of the first embodiment is applied, the headlamp 11 has a function of turning on the high beam, a function of turning on the light-shielding high beam, and a function of turning on the low beam.

On the other hand, in the own vehicle 1 to which the headlamp control device 18 of the second embodiment is applied, the headlamp 11 has a function of turning on the high beam and a function of turning on the low beam, and does not have a function of turning on the light-shielding high beam. The operation of the driver of the own vehicle 1 received by HMI13 includes, for example, an operation of turning OFF the function of the light distribution switching control of the headlamp 11 from the lighting state of the high beam to the lighting state of the low beam. When HMI13 receives, from the driver of the own vehicle 1, an operation of turning OFF the light distribution switching control function of the headlamp 11 from the high-beam lighting state to the low-beam lighting state, the communication device 17 transmits information indicating the operation to the big data analysis unit SY1. In addition, the communication device 17 transmits, to the big data analysis unit SY1, information indicating the traveling position of the own vehicle 1 and forward camera images when HMI13 accepts the manipulation.

In an example of a vehicle recognition sensitivity adjustment system SY including an own vehicle 1 to which a headlamp control device 18 of a second embodiment is applied, the big data analysis unit SY1 learns the recognition sensitivity of the forward vehicle in which the lamp included in the forward camera image of the probe vehicle PV suitable for respective traveling positions of the probe vehicle PV is lit, using the traveling position of the probe vehicle PV and the forward camera image of the probe vehicle PV when the driver of the probe vehicle PV performs an operation of turning OFF a function of a light distribution switching control of a headlamp of the probe vehicle PV from a lighting state of a high beam to a lighting state of a light shielding high beam, and the traveling position of the probe vehicle PV and the forward camera image of the probe vehicle PV when the driver of the probe vehicle PV performs an operation of turning OFF a function of a light distribution switching control of a headlamp of the probe vehicle PV from a lighting state of a high beam to a lighting state of a low beam.

In another example of the vehicle recognition sensitivity adjustment system SY including the own vehicle 1 to which the headlamp control device 18 of the second embodiment is applied, the big data analysis unit SY1 learns the recognition sensitivity of the forward vehicle in which the lamp included in the forward camera image of the probe vehicle PV suitable for respective traveling positions of the probe vehicle PV is lit, using the traveling position of the probe vehicle PV and the forward camera image of the probe vehicle PV when the driver of the probe vehicle PV performs an operation of turning OFF a function of a light distribution switching control of a headlamp of the probe vehicle PV from a lighting state of a high beam to a lighting state of a low beam, without using the traveling position of the probe vehicle PV and the forward camera image of the probe vehicle PV when the driver of the probe vehicle PV performs an operation of turning OFF a function of a light distribution switching control of a headlamp of the probe vehicle PV from a lighting state of a high beam to a lighting state of a low shielding high beam.

As described above, in the own vehicle 1 to which the headlamp control device 18 of the first embodiment is applied, the control unit 3C executes the light distribution switching control of the headlamp 11 of the own vehicle 1 from the lighting state of the high beam to the lighting state of the light-shielded high beam when the forward vehicle that is lighting the lamp included in the forward camera image of the own vehicle 1 is recognized by the vehicle recognition unit 3B.

On the other hand, in the own vehicle 1 to which the headlamp control device 18 according to the second embodiment is applied, when the forward vehicle that is lighting the lamp included in the forward camera image of the own vehicle 1 is recognized by the vehicle recognition unit 3B, the control unit 3C executes the light distribution switching control of the headlamp 11 of the own vehicle 1 from the lighting state of the high beam to the lighting state of the low beam.

As described above, in the own vehicle 1 to which the headlamp control device 18 of the first embodiment is applied, when the driver of the own vehicle 1 performs an operation of turning OFF the light distribution switching control function of the headlamp of the own vehicle 1 from the lighting state of the high beam to the lighting state of the light shielding high beam in the same manner as in the probe vehicle PV, the own vehicle 1 transmits information indicating the operation to the big data analysis unit SY1, and transmits information indicating the traveling position of the own vehicle 1 and the forward camera image of the own vehicle 1 when the driver of the own vehicle 1 performs the operation to the big data analysis unit SY1.

On the other hand, in the own vehicle 1 to which the headlamp control device 18 of the second embodiment is applied, in the same way as the probe vehicle PV, when the driver of the own vehicle 1 performs an operation of turning OFF the light distribution switching control function of the headlamp of the own vehicle 1 from the lighting state of the high beam to the lighting state of the low beam, the own vehicle 1 transmits information indicating the operation to the big data analysis unit SY1, and transmits information indicating the traveling position of the own vehicle 1 and the forward camera image of the own vehicle 1 when the driver of the own vehicle 1 performs the operation to the big data analysis unit SY1.

Third Embodiment

The own vehicle 1 to which the headlamp control device 18 of the third embodiment is applied is configured in the same manner as the own vehicle 1 to which the headlamp control device 18 of the first or second embodiment described above is applied, except for the point described later.

In the own vehicle 1 to which the headlamp control device 18 of the third embodiment is applied, when the driver of the own vehicle 1 performs an operation of turning OFF the light distribution switching control function of the headlamp of the own vehicle 1 from the lighting state of the high beam to the lighting state of the light shielding high beam or the low beam, the own vehicle 1 does not transmit the information indicating the operation to the big data analysis unit SY1, and does not transmit the information indicating the traveling position of the own vehicle 1 and the forward camera image of the own vehicle 1 to the big data analysis unit SY1 when the driver of the own vehicle 1 performs the operation. That is, the own vehicle 1 does not have a function as a probe vehicle PV.

As described above, the headlamp control device, the headlamp control method, and the program embodiments of the present disclosure have been described with reference to the drawings, but the headlamp control device, the headlamp control method, and the program of the present disclosure are not limited to the above-described embodiments, and can be appropriately modified without departing from the spirit of the present disclosure. The configuration of each example of the above-described embodiment may be combined as appropriate. In the embodiments described above, the process performed in the headlamp control device 18 (ECU) is described as a software process performed by executing a program, but the process performed in the headlamp control device 18 may be a process performed by hardware. Alternatively, the process performed in the headlamp control device 18 may be a combined process of both software and hardware. Further, a program stored in the memory 182 of the headlamp control device 18 (a program for realizing the function of the processor 183 of the headlamp control device 18) may be provided and distributed by being recorded in a computer-readable storage medium such as a semiconductor memory, a magnetic recording medium, an optical recording medium, or the like.

What is claimed is:

1. A headlamp control device, comprising:

a vehicle recognition unit that recognizes a forward vehicle with a lamp lit included in a forward camera image of an own vehicle;

a control unit for executing light distribution switching control of a headlamp of the own vehicle when the forward vehicle with the lamp lit included in the forward camera image of the own vehicle is recognized by the vehicle recognition unit, the light distribution switching control being light distribution switching control of the headlamp of the own vehicle from a high-beam lit state to a shielded high-beam lit state, or light distribution switching control of the headlamp of the own vehicle from the high-beam lit state to a low-beam lit state, the shielded high-beam being a high-beam in which the forward vehicle with the lamp lit that is included in the forward camera image of the own vehicle, and surroundings of the forward vehicle, are shielded from light;

an acquisition unit for acquiring a result of learning of recognition sensitivity of the forward vehicle with the lamp lit included in a forward camera image of a probe vehicle that is suitable for each traveling position of the probe vehicle, performed using a traveling position of the probe vehicle and the forward camera image of the probe vehicle, the traveling position of the probe vehicle and the forward camera image of the probe vehicle being a traveling position and a forward camera image when a driver of the probe vehicle performs an operation of turning off a function of light distribution switching control of a headlamp of the probe vehicle from a high-beam lit state to a shielded high-beam lit state, or an operation of turning off a function of light distribution switching control of the headlamp of the probe vehicle from the high-beam lit state to a low-beam lit state; and a vehicle recognition sensitivity adjustment unit that executes adjustment of recognition sensitivity of the forward vehicle with a lamp lit included in a forward camera image of the own vehicle at each traveling position of the own vehicle, based on the result of the learning acquired by the acquisition unit.

2. The headlamp control device according to claim 1, wherein the acquisition unit acquires a detection result of a steering angle sensor of the own vehicle, and when a steering angle detected by the steering angle sensor is equal to or greater than a steering angle threshold value, the vehicle recognition sensitivity adjustment unit sets the recognition sensitivity of the forward vehicle with a lamp lit included in the forward camera image of the own vehicle to a default value.

3. The headlamp control device according to claim 1, wherein the acquisition unit acquires a detection result of a vehicle speed sensor of the own vehicle, and when vehicle speed detected by the vehicle speed sensor is equal to or higher than a vehicle speed threshold value, the vehicle recognition sensitivity adjustment unit sets the recognition sensitivity of the forward vehicle with a lamp lit included in the forward camera image of the own vehicle to a default value.

4. A headlamp control method, comprising:

recognizing, by a headlamp control device, a forward vehicle with a lamp lit included in a forward camera image of an own vehicle;

executing light distribution switching control of a headlamp of the own vehicle when the forward vehicle with the lamp lit included in the forward camera image of the own vehicle is recognized in the recognizing, the light distribution switching control being the headlamp control device performing light distribution switching control of the headlamp of the own vehicle from a high-beam lit state to a shielded high-beam lit state, or light distribution switching control of the headlamp of the own vehicle from the high-beam lit state to a low-beam lit state, the shielded high-beam being a high-beam in which the forward vehicle with the lamp lit included in the forward camera image of the own vehicle, and surroundings of the forward vehicle, are shielded from light;

acquiring a result of learning of recognition sensitivity of the forward vehicle with the lamp lit included in a forward camera image of a probe vehicle that is suitable for each traveling position of the probe vehicle, performed using a traveling position of the probe vehicle and the forward camera image of the probe vehicle, the traveling position of the probe vehicle and the forward camera image of the probe vehicle being a traveling position and a forward camera image for the headlamp control device when a driver of the probe vehicle performs an operation of turning off a function of light distribution switching control of a headlamp of the probe vehicle from a high-beam lit state to a shielded high-beam lit state, or an operation of turning off a function of light distribution switching control of the headlamp of the probe vehicle from the high-beam lit state to a low-beam lit state; and executing, by the headlamp control device, adjustment of recognition sensitivity of the forward vehicle with a lamp lit included in a forward camera image of the own vehicle at each traveling position of the own vehicle, based on the result of the learning acquired in the acquiring.

5. A non-transitory storage medium storing a program causing a processor to execute recognizing a forward vehicle with a lamp lit included in a forward camera image of an own vehicle;

executing light distribution switching control of a headlamp of the own vehicle when the forward vehicle with the lamp lit included in the forward camera image of the own vehicle is recognized in the recognizing, the light distribution switching control being light distribution switching control of the headlamp of the own vehicle from a high-beam lit state to a shielded high-beam lit state, or light distribution switching control of the headlamp of the own vehicle from the high-beam lit state to a low-beam lit state, the shielded high-beam being a high-beam in which the forward vehicle with the lamp lit included in the forward camera image of the own vehicle, and surroundings of the forward vehicle, are shielded from light;

acquiring a result of learning of recognition sensitivity of the forward vehicle with the lamp lit that is included in a forward camera image of a probe vehicle that is suitable for each traveling position of the probe vehicle, performed using a traveling position of the probe vehicle and a forward camera image of the probe vehicle, the traveling position of the probe vehicle and the forward camera image of the probe vehicle being a traveling position and a forward camera image when a driver of the probe vehicle performs an operation of turning off a function of light distribution switching control of a headlamp of the probe vehicle from a high-beam lit state to a shielded high-beam lit state, or an operation of turning off a function of light distribution switching control of a headlamp of the probe vehicle from the high-beam lit state to a low-beam lit state; and executing adjustment of recognition sensitivity of the forward vehicle with a lamp lit that is included in the forward camera image of the own vehicle at each traveling position of the own vehicle, based on the result of the learning acquired in the acquiring.

\* \* \* \* \*